United States Patent [19]

Schütze et al.

[11] Patent Number: 5,145,964

[45] Date of Patent: Sep. 8, 1992

[54] PROCESS FOR THE PREPARATION OF PERYLENE-3,4,9,10-TETRACARBOXYDIIMIDES IN A COLORISTICALLY VALUABLE PIGMENT FORM

[75] Inventors: Detlef-Ingo Schütze; Dietmar Müller, both of Cologne, Fed. Rep. of Germany

[73] Assignee: Bayer Aktiengesellschaft, Leverkusen, Fed. Rep. of Germany

[21] Appl. No.: 662,053

[22] Filed: Feb. 28, 1991

[30] Foreign Application Priority Data

Mar. 10, 1990 [DE] Fed. Rep. of Germany ....... 4007728

[51] Int. Cl.$^5$ .......................................... C07D 471/06
[52] U.S. Cl. ................................................... 546/37
[58] Field of Search .......................................... 546/37

[56] References Cited

U.S. PATENT DOCUMENTS

| | | | |
|---|---|---|---|
| 4,230,858 | 10/1980 | Gall et al. | 546/37 |
| 4,262,851 | 4/1981 | Graser et al. | 546/37 |
| 4,286,094 | 8/1981 | Hoch et al. | 546/37 |
| 4,404,386 | 9/1983 | Babler | 546/37 |
| 4,431,806 | 7/1984 | Spietschka et al. | 546/37 |
| 4,496,731 | 1/1985 | Spietschka et al. | 546/37 |
| 4,655,845 | 4/1987 | Spietschka et al. | 106/309 |

FOREIGN PATENT DOCUMENTS

| | | |
|---|---|---|
| 1115711 | 10/1961 | Fed. Rep. of Germany . |
| 1142339 | 6/1963 | Fed. Rep. of Germany . |
| 2714778 | 12/1978 | Fed. Rep. of Germany . |
| 1-168688 | 4/1989 | Japan . |

Primary Examiner—C. Warren Ivy
Assistant Examiner—Raymond Covington
Attorney, Agent, or Firm—Sprung Horn Kramer & Woods

[57] ABSTRACT

Brilliant and easily dispersible perylene-3,4,9,10-tetracarboxydiimide pigments of high color strength and N-alkyl derivatives thereof having 1 to 4 carbon atoms per alkyl group can be prepared by subjecting finely divided crude pigments to a treatment by means of a mixture of water and an organic solvent from the class of alcohols, ketones, carboxylic acids or carboxylic esters.

7 Claims, No Drawings

PROCESS FOR THE PREPARATION OF PERYLENE-3,4,9,10-TETRACARBOXYDIIMIDES IN A COLORISTICALLY VALUABLE PIGMENT FORM

The invention relates to a new process for the preparation of brilliant and easily dispersible perylene-3,4,9,10-tetracarboxydiimide pigments of high colour strength and N-alkyl derivatives thereof.

Perylene-3,4,9,10-tetracarboxydiimide and N-alkyl derivatives thereof are, due to their high fastness level, valuable pigments having an extremely high fastness level for the colouring of paints and plastics.

Processes for the preparation of perylene-3,4,9,10-tetracarboxydiimide pigments and N-alkyl derivatives thereof have been known for many years. In particular, processes have been developed for converting the opaque crude pigments of low colour strength formed in the synthesis into a coloristically interesting pigment form.

The customary processes known in the literature for converting crude pigments into a finely divided pigment form, such as, for example, milling in the absence or presence of salt in a ball mill or reprecipitation, for example, from a sulphuric acid solution, are not sufficient in the case of perylene-3,4,9,10-tetracarboxydiimide crude pigments, since the pigments after such a treatment have a strong tendency to form aggregates and agglomerates during workup and in particular during drying, which is linked to a loss in colour strength and in particular to a high grain hardness.

A series of processes for overcoming the difficulties mentioned have been described in the literature.

Thus, for example, according to details given by German Patent Specification 1,115,711, a pigment of colour strength is obtained by heating the moist press cake of perylene-3,4,9,10-tetracarboxydiimide obtained by one of the dispersion processes, such as, for example, reprecipitation from sulphuric acid or milling in the presence of salt in a ball mill, followed by removal of the salt with water, together with a high-boiling solvent, such as, for example, nitrobenzene until the water has been completely distilled off.

Variations on the milling of the crude pigment in the presence of salt in which long-chain aliphatic alcohols (DE-OS (German Published Specification) 1,914,208) or long-chain aliphatic amines (DE-OS (German Published Specification) 2,063,714) have been added for the milling were also described.

Furthermore, according to details given by German Patent Specification 1,142,339, the pigment form is said to be retained after reprecipitation from sulphuric acid if the perylene-3,4,9,10-tetracarboxydiimide prepared in finely divided form is vigorously mixed with an oil-soluble polar compound, dried and milled.

DE-OS (German Published Specification) 1,619,531 describes a further process in which perylene-3,4,9,10-tetracarboxydiimide is said to be converted into a pigment form of high colour strength by milling in the presence of alcohols, ketones, aliphatic or aromatic hydrocarbons.

This is in contrast to the process of DE-OS (German Published Specification) 2,316,536 in which the crude pigment is first milled in the presence or absence of milling aids and the milled material is then treated with amines, heterocyclic bases, carboximides or with 75 to 84% strength sulphuric acid.

A method which deviates from the processes mentioned so far is described in DE-OS (German Published Specification) 2,837,731 and DE-OS (German Published Specification) 2,727,484. In this method, perylene-3,4,9,10-tetracarboxydiimide or the N-alkyl derivative thereof is first converted with sodium dithionite into its leuko form and then oxidised under the influence of shear forces in the presence of surface-active compounds or in the presence of surface-active compounds and in the absence of shear forces.

The prior art processes mentioned have either the disadvantage that they do not meet today's requirements of colour strength and in particular dispersibility for the coloration of paints, printing inks or plastics or, in addition to high technical complexities, do not meet today's ecological requirements of the processes.

Surprisingly, it has now been found that brilliant and easily dispersible perylene-3,4,9,10-tetracarboxydiimides of high colour strength and N-alkyl derivatives thereof having 1 to 4 carbon atoms per alkyl group are obtained by bringing the crude pigments first into a finely divided form by milling in the absence of organic solvents with or without the addition of salts, such as, for example, sodium chloride or sodium sulphate, by kneading in the presence of salt or, alternatively, by reprecipitation from sulphuric acid and then, after removing the salt by washing with water, if salts were used as milling aids, and washing the acid with water, if sulphuric acid was used, subjecting them to a treatment by means of a mixture of water and an organic solvent from the class of alcohols, ketones, carboxylic acids or carboxylic esters.

The treatment is carried out, for example, at temperatures between 60° C. and 200° C., preferably at temperatures between 80° C. and 150° C., if appropriate under elevated pressure.

The treatment is carried out, for example, over a period of 0.5 to 20 hours, preferably the period is 0.5 to 12 hours.

The intermediate obtained by milling, kneading or reprecipitation of the crude pigments is preferably used as aqueous press cake in the solvent treatment which follows.

Solvents which are suitable for the treatment are from the class of aliphatic alcohols, preferably alkanols having 1 to 10 carbon atoms, for example methanol, ethanol, propanol, butanol, hexanol, decanol, ethylene glycol or propylene glycol; from the class of aliphatic and cycloaliphatic ketones, for example acetone, methyl ethyl ketone or cyclohexanone; from the class of esters of aliphatic carboxylic acids, preferably $C_1$-$C_4$-alkyl esters of alkanecarboxylic acids having 1 to 8 carbon atoms, such as, for example, methyl formate, ethyl formate, methyl acetate, ethyl acetate, propyl acetate, butyl acetate, methyl propionate, methyl valerate, ethyl valerate, dimethyl adipate, diethyl adipate, diethyl citrate; from the class of esters of aromatic carboxylic acids, preferably $C_1$-$C_4$-alkyl esters of benzene mono- and -dicarboxylic acids, which are unsubstituted or substituted by hydroxyl, for example $C_1$-$C_4$-alkyl esters of benzoic acid, salicylic acid or phthalic acid, such as methyl benzoate, ethyl benzoate, methyl salicylate, ethyl salicylate, dimethyl phthalate or diethyl phthalate.

$C_1$-$C_4$-alkyl esters of benzoic acid and phthalic acid are particularly preferred for the solvent treatment, methyl benzoate and dimethyl phthalate are very particularly preferred.

If appropriate, the solvent treatment is carried out in the presence of an acid buffer, such as, for example, sodium acetate or trisodium phosphate.

The organic liquid should be present in the conditioning medium in amounts of at least 0.1 parts by weight per part by weight of dry pigment. This ratio can vary within wide limits and depends on the type of the particular organic liquid. Preferably, 0.1 to 100 parts by weight, particularly preferably 0.2 to 50 parts by weight of organic liquid are used per part by weight of dry pigment.

If esters of aromatic carboxylic acids are used, 0.2 to 3 parts by weight are preferably used per part by weight of dry pigment.

Preferably, the treatment medium furthermore contains 1 to 30 parts by weight of water, particularly preferably 3 to 20 parts by weight, very particularly preferably 5 to 12 parts by weight of water per part by weight of dry pigment.

After the conditioning is completed, the pigment is freed of the organic liquid in a conventional manner, for example by washing with water or distillation with or without steam, the applicability of these methods being determined by the solubility properties of the organic liquid.

The pigment can be easily freed of the carboxylic esters by hydrolysing the esters to water-soluble carboxylates.

The starting material used are the crude pigments synthesised by the preparation processes known from the literature, for example prepared by melting naphthalene-1,8-dicarboximide (B.I.O.S. Final Report No. 1484, p. 21, DE-OS (German Published Specification) 3,345,810), by melting acenaphthenequinone monoxime or dioxime with alkali (German Patent Specification 276,357) or by condensation of perylene-3,4,9,10-tetracarboxylic acid or its anhydride with ammonia (German Patent Specification 386,057) or with methylamine (DE-OS (German Published Specification) 2,504,481, DE-OS (German Published Specification) 2,153,087) or by methylation of perylene-3,4,9,10-tetracarboxydiimide (DE-OS (German Published Specification) 2,726,682).

It is furthermore advantageous to purify the perylene-3,4,9,10-tetracarboxydiimide or the N-alkyl derivative thereof which is used as crude product beforehand by recrystallisation from sulphuric acid or by stirring in hot concentrated sulphuric acid.

The perylene-3,4,9,10-tetracarboxydiimide pigments and N-alkyl derivatives thereof obtainable as described above are highly brilliant pigments of high colour strength and are suitable, depending on the type and duration of the treatment, in particular for the coloration of plastics, such as, for example polyvinyl chloride, polyethylene or polypropylene, or for pigmenting, for example, stoving enamels. The pigments show very good dispersibility, a very good flow behaviour in the paint and produce brilliant colorations of high colour strength.

The examples which follow illustrate the invention without limiting it to details.

EXAMPLE 1

15 g of perylene-3,4,9,10-tetracarboxydiimide were milled together with 150 g of sodium chloride in a vibrating mill having a volume of 1 liter and being filled with 1700 g of steel steel balls of diameter 10-20 mm for 15 hours. The milled material was then introduced into water, filtered off with suction and washed with water until free from sodium chloride. This gave about 40 g of a water-moist press cake of finely divided perylene-3,4,9,10-tetracarboxydiimide.

70 g of water, 0.45 g of anhydrous sodium acetate and 4 g of dimethyl phthalate were then added to the moist press cake, and the mixture was stirred at 100° C. for 1 hour.

The dimethyl phthalate was then hydrolysed with 4.5 g of 50% strength sodium hydroxide solution at 80° C. over a period of 2 hours. The product was filtered off with suction, washed and dried.

This gave 14.6 g (97.3% of theory) of a highly dispersible maroon pigment which, for example in stoving enamels, produces brilliant colorations of high colour strength and a highly flowable paint.

EXAMPLE 2

The procedure of Example 1 was repeated, except that 3.5 g of methyl benzoate were used instead of the dimethyl phthalate.

14.4 g (96% of theory) of the highly dispersible pigment were obtained, which in stoving enamels has the same good properties as the product obtained according to Example 1.

EXAMPLE 3

The initial procedure of Example 1 was repeated, except that the moist press cake was then heated, after the addition of 70 ml of water and 90 ml of methanol, in an autoclave at 150° C. for 5 hours. The methanol was then distilled off, the product was filtered off with suction, washed and dried.

This gave 14.5 g (96.7% of theory) of the brilliant pigment of high colour strength, which likewise, when used for the coloration of stoving enamels, produces a highly flowable paint.

EXAMPLE 4

The procedure of Example 3 was repeated, except that 75 ml of butanol were used instead of methanol and the mixture was heated at 140° C. for 8 hours. In this manner, (14.1 g=94% of theory) of pigment were obtained, which, for example in PVC, shows very good dispersibility, a high colour strength and brilliance.

EXAMPLE 5

The procedure of Example 1 was repeated, except that 15 g of N,N'-dimethylperylene-3,4,9,10-tetracarboxydiimide were used instead of 15 g of perylene-3,4,9,10-tetracarboxydiimide.

14.3 g (95.3% of theory) of a yellowish-red pigment of high colour strength were obtained, which likewise has good dispersibility.

EXAMPLE 6

The procedure of Example 3 was repeated, except that 15 g of N,N'-dimethylperylene-3,4,9,10-tetracarboxydiimide were used instead of 15 g of perylene-3,4,9,10-tetracarboxydiimide.

The red pigment obtained in this manner (14.3 g=95.3% of theory) also has good dispersibility, high colour strength and brilliance.

EXAMPLE 7

15 g of N,N'-dimethylperylene-3,4,9,10-tetracarboxydiimide were dissolved at room temperature in 300 ml of concentrated sulphuric acid. The solution was then poured into ice water, the product was filtered off with suction and washed with water until neutral.

The water-moist press cake was then stirred with 70 ml of water, 0.45 g of anhydrous sodium acetate and 4 g of dimethyl phthalate, and the mixture was heated at 100° C. for 2 hours.

The dimethyl phthalate was then hydrolysed at 80° C. for a period of 2 hours by adding 4.5 g of 50% strength sodium hydroxide solution. The product was filtered off with suction, washed and dried.

This gave 14.2 g (94.7% of theory) of the red pigment, which produces brilliant colorations of high colour strength in the stoving enamel and has good dispersibility.

EXAMPLE 8

The procedure of Example 7 was repeated, except that 15 g of perylene-3,4,9,10-tetracarboxydiimide were used instead of 15 g of N,N'-dimethylperylene-3,4,9,10-tetracarboxydiimide.

14.3 g (95.3% of theory) of the brilliant maroon pigment of good dispersibility and high colour strength were obtained.

We claim:

1. Process for the preparation of brilliant and easily dispersible perylene-3,4,9,10-tetracarboxydiimides of high color strength and N-alkyl derivative thereof having 1 to 4 carbon atoms per alkyl group, characterized in that the crude pigments are first brought into a finely divided form by milling in the absence of organic solvents with or without the addition of salt, by kneading in the presence of salt or reprecipitation from sulphuric acid, and then, after removal of salt or sulphuric acid, subjected to a treatment by means of a mixture of water and an organic solvent selected from the group consisting of alcohols, aliphatic or cycloaliphatic ketones, carboxylic acids and carboxylic esters.

2. Process according to claim 1, characterized in that it is carried out at temperatures between 60° C. and 200° C. and, if appropriate, under elevated pressure.

3. Process according to claim 1, characterized in that mixtures of water and $C_1$–$C_4$-alkyl esters of aromatic carboxylic acids are used.

4. Process according to claim 1, characterized in that methyl benzoate or dimethyl phthalate is used.

5. Process according to claim 1, characterized in that the starting material of the solvent treatment is used in the form of a moist press cake.

6. Process according to claim 1, characterized in that the treatment is carried out with 0.1 to 100 parts by weight of organic solvent per part by weight of dry pigment.

7. Process according to claim 1, characterized in that the treatment medium contains 1 to 30 parts by weight of water per part by weight of dry pigment.

* * * * *